April 20, 1943.    E. S. CORNELL ET AL    2,316,844
SWITCHING DEVICE
Filed Nov. 12, 1940    7 Sheets-Sheet 5
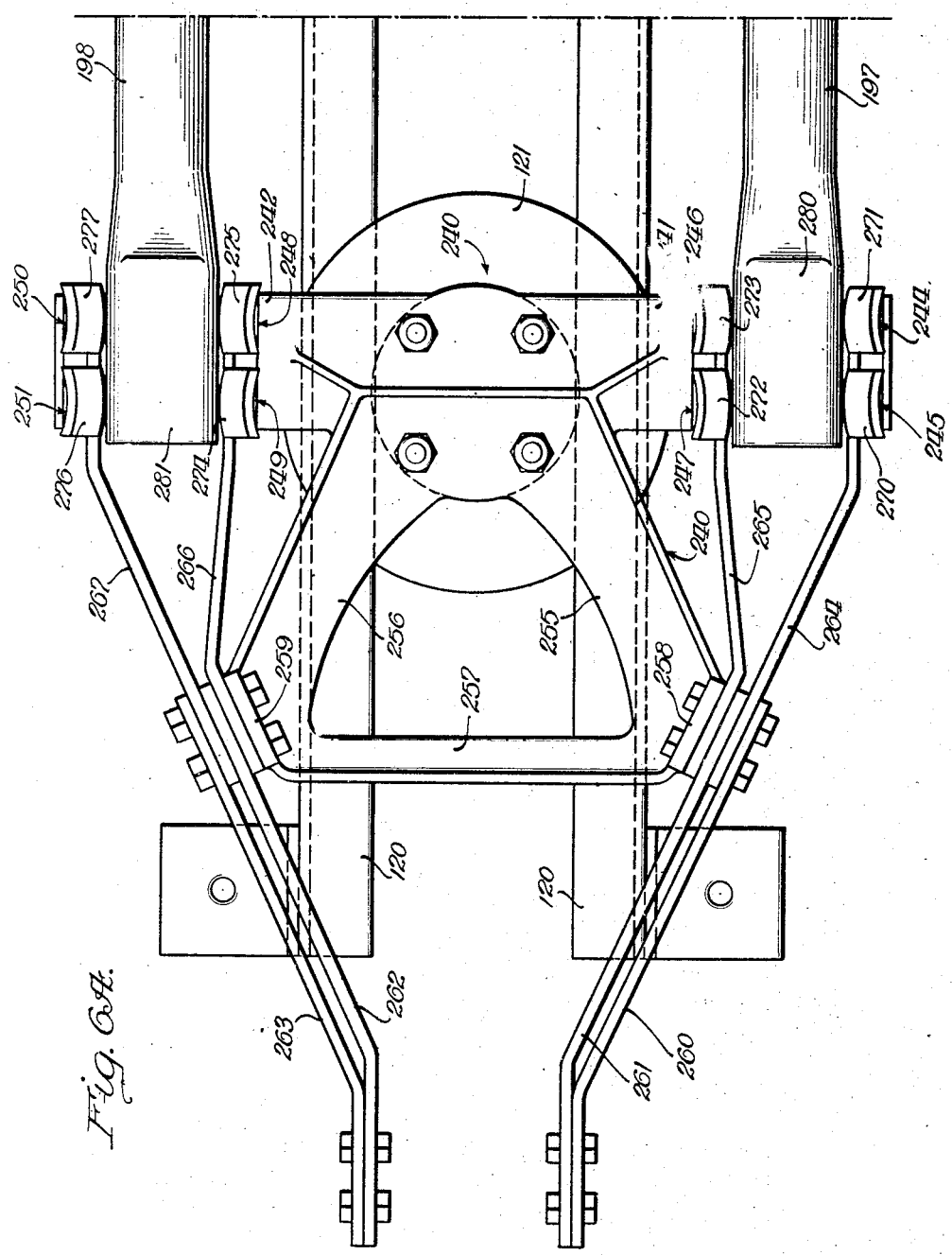
Inventors
Elias S. Cornell
Thorsten Fjellstedt
Stanley C. Killian
BY Richardson and Quer
Attys.

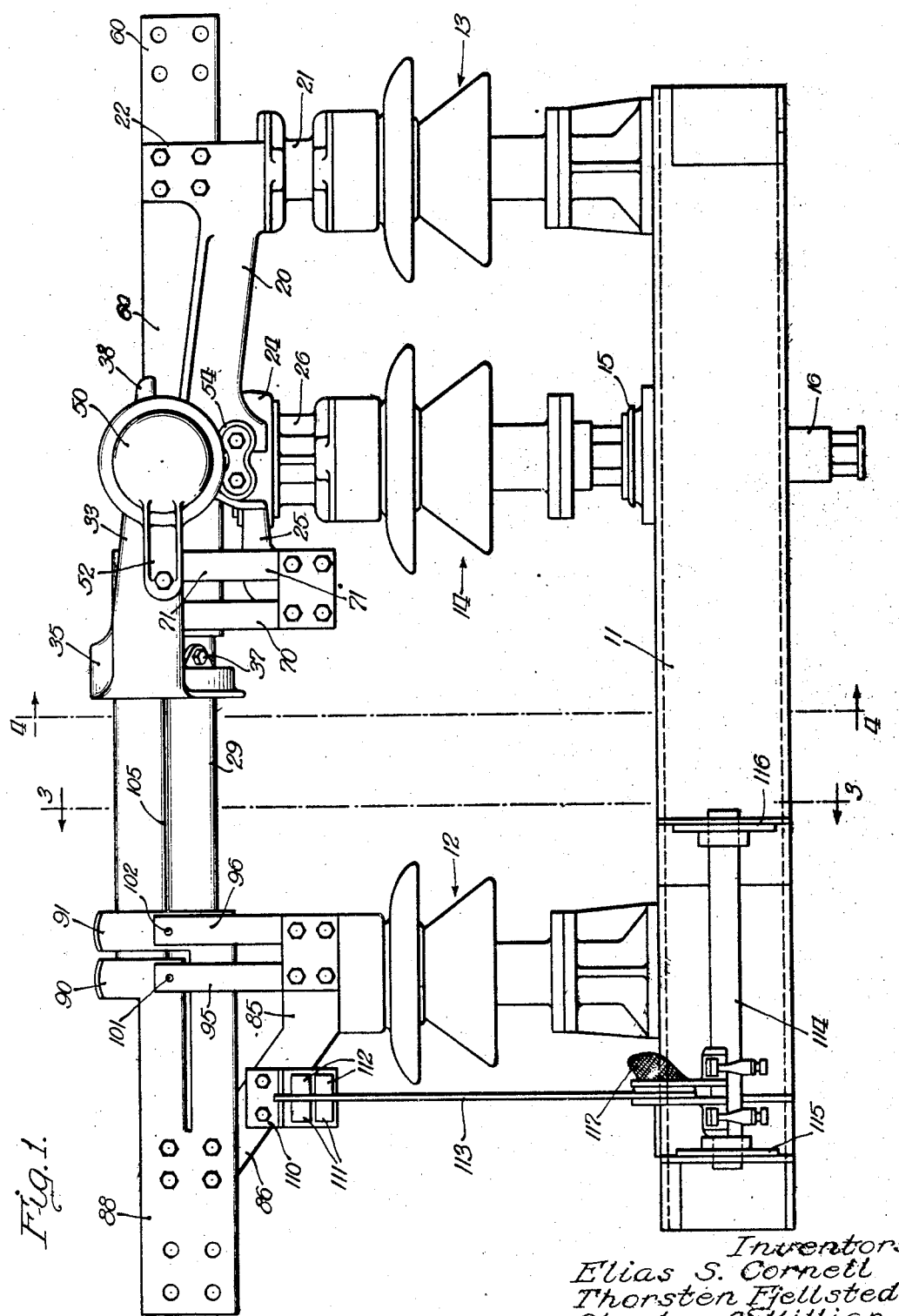

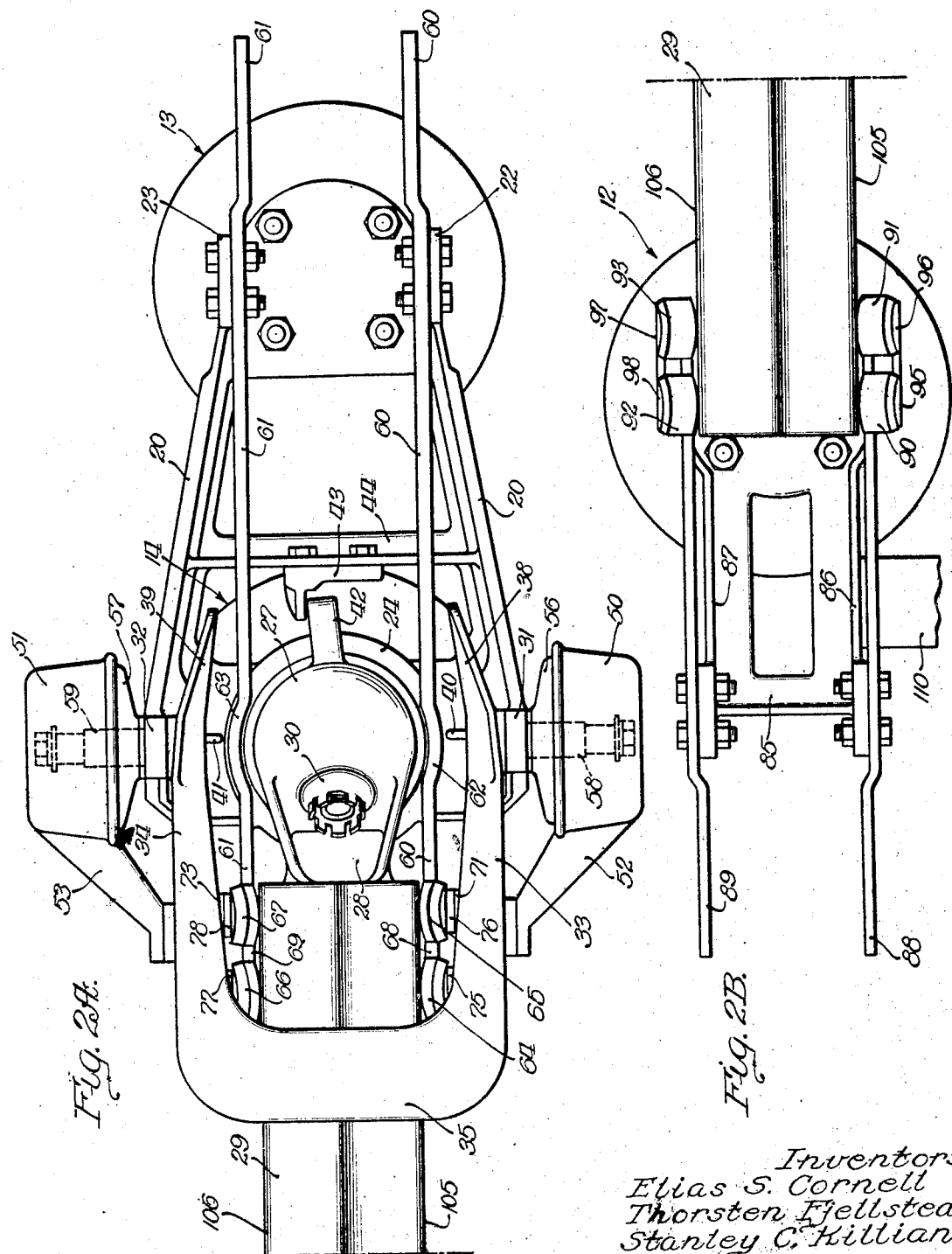

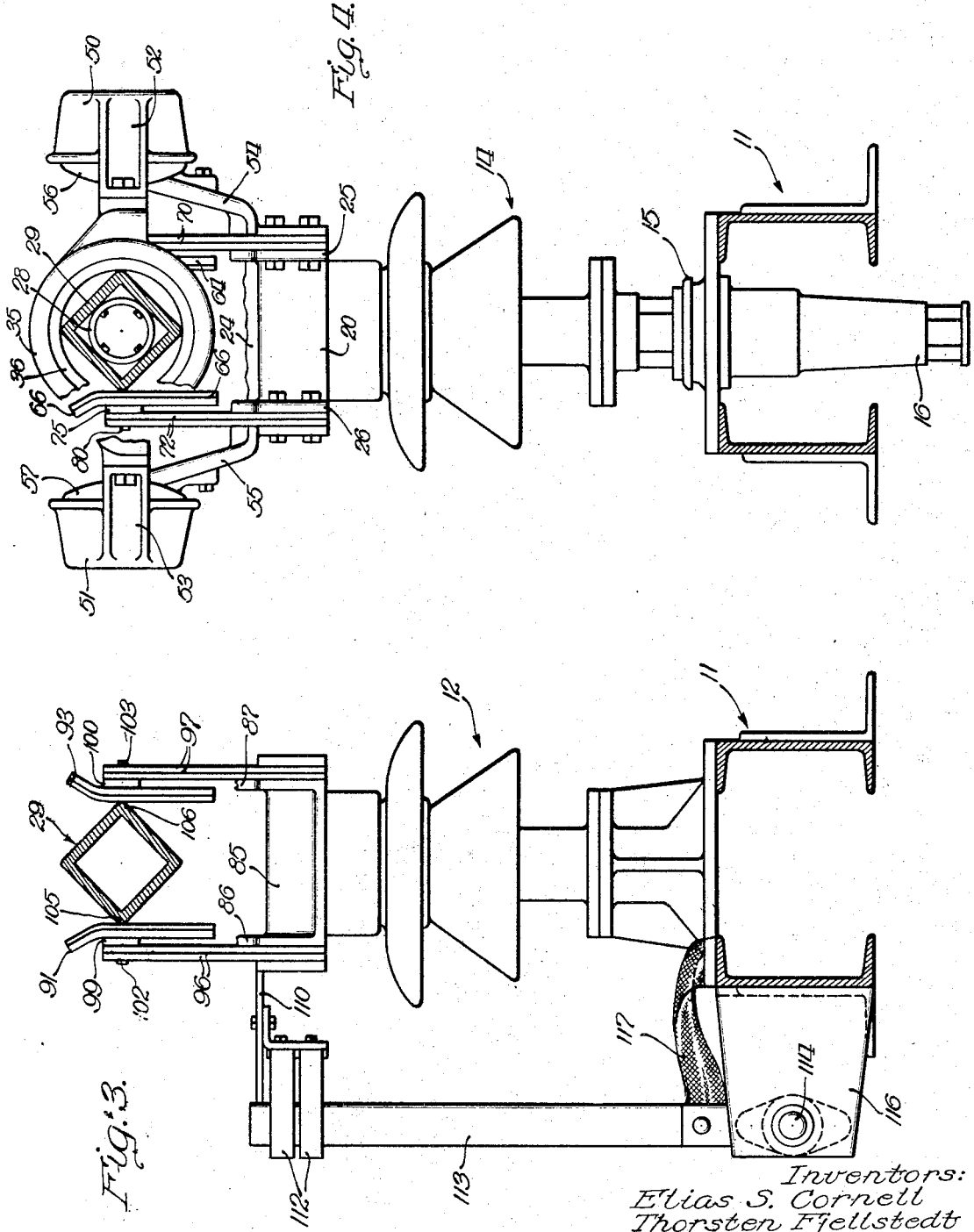

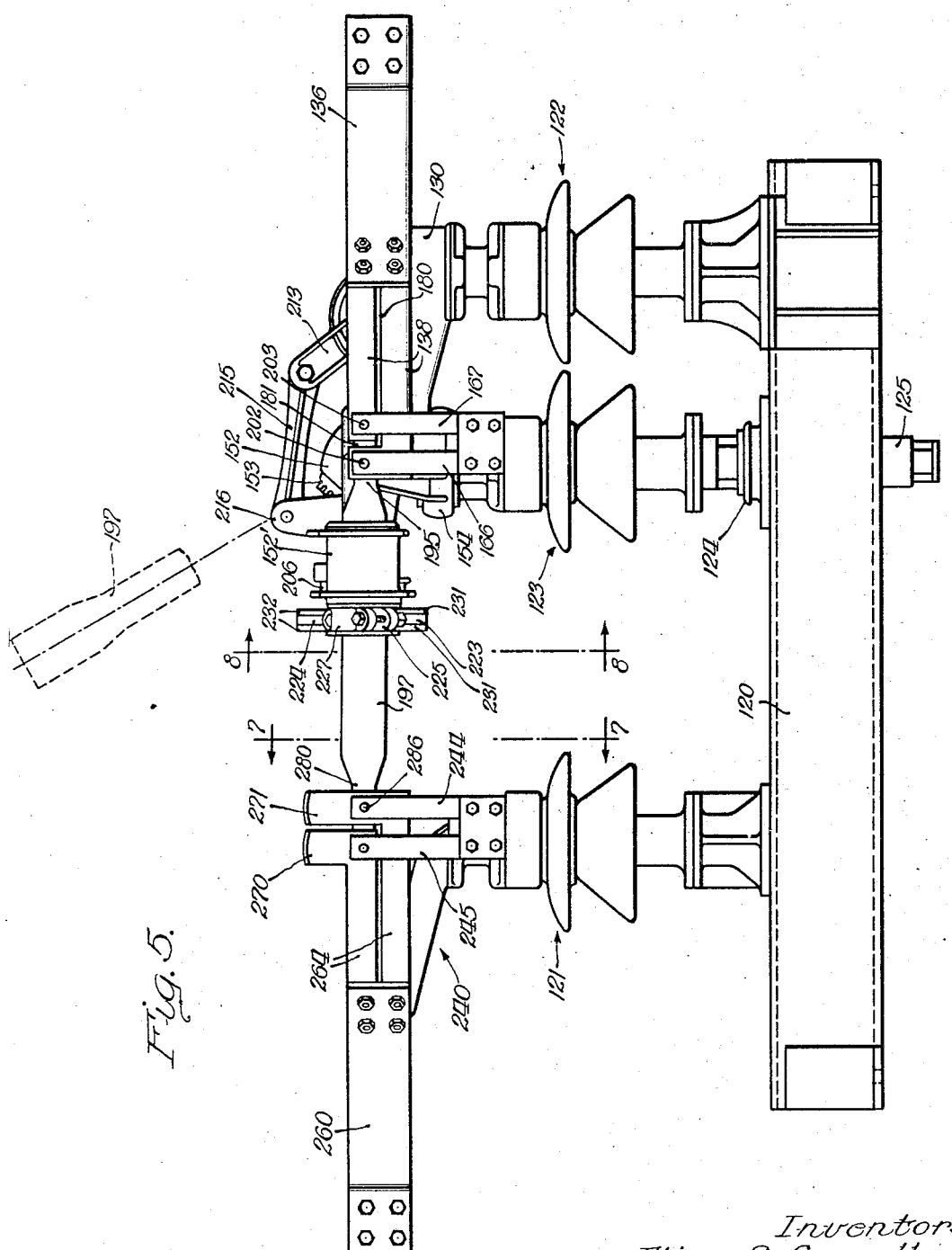

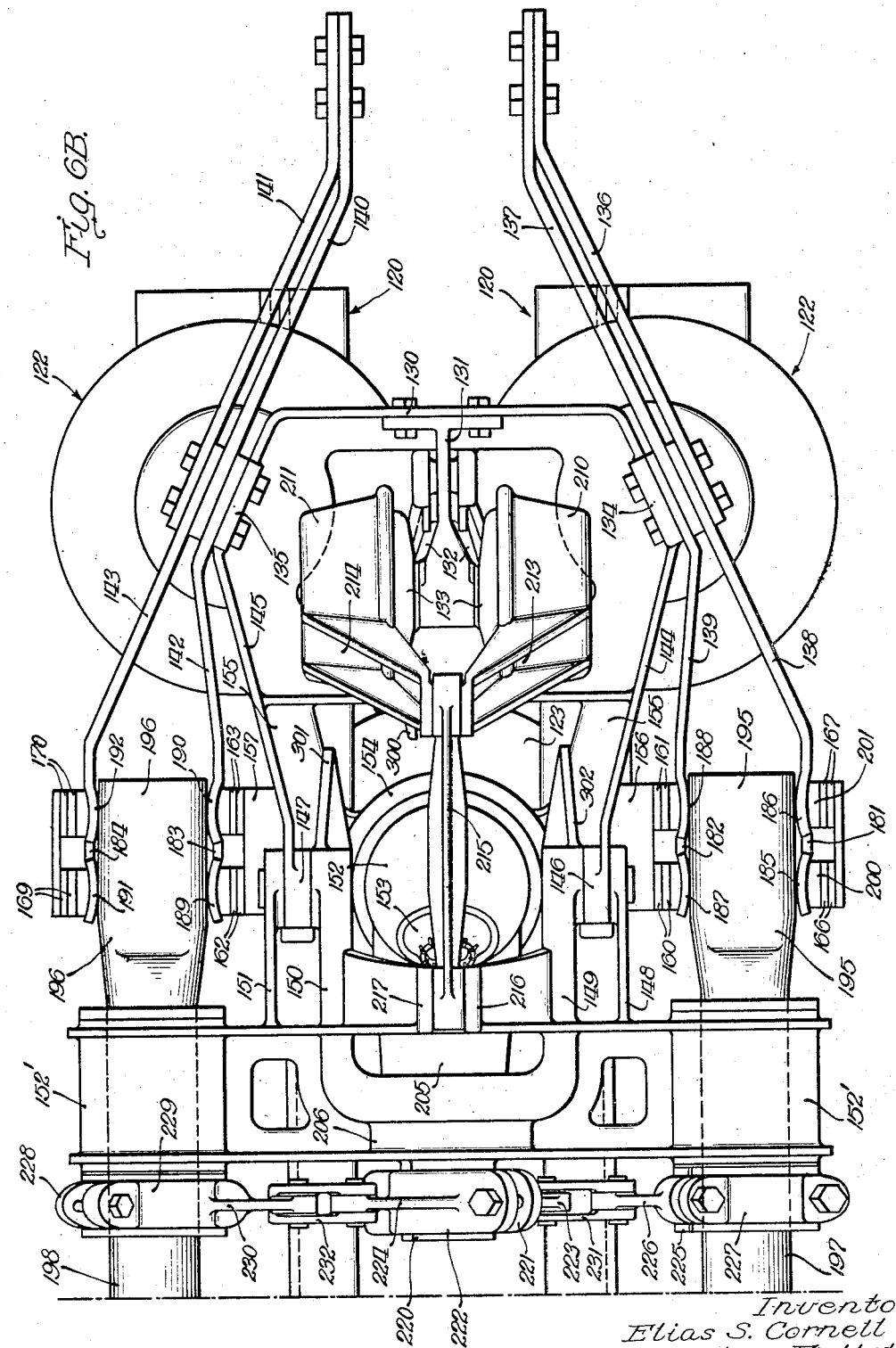

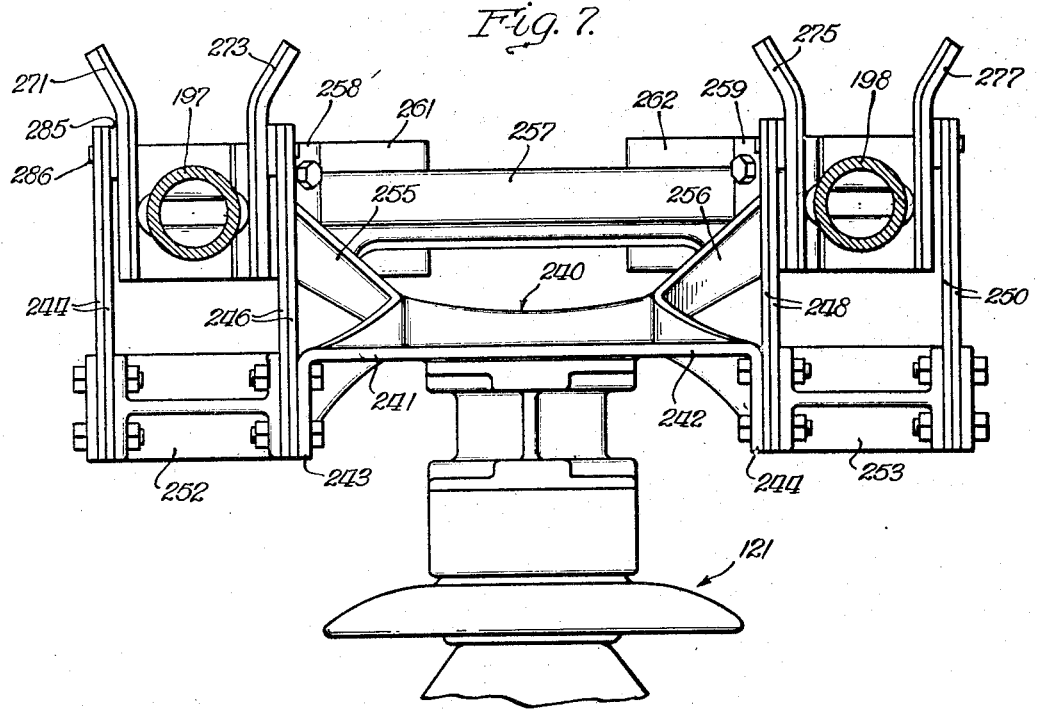
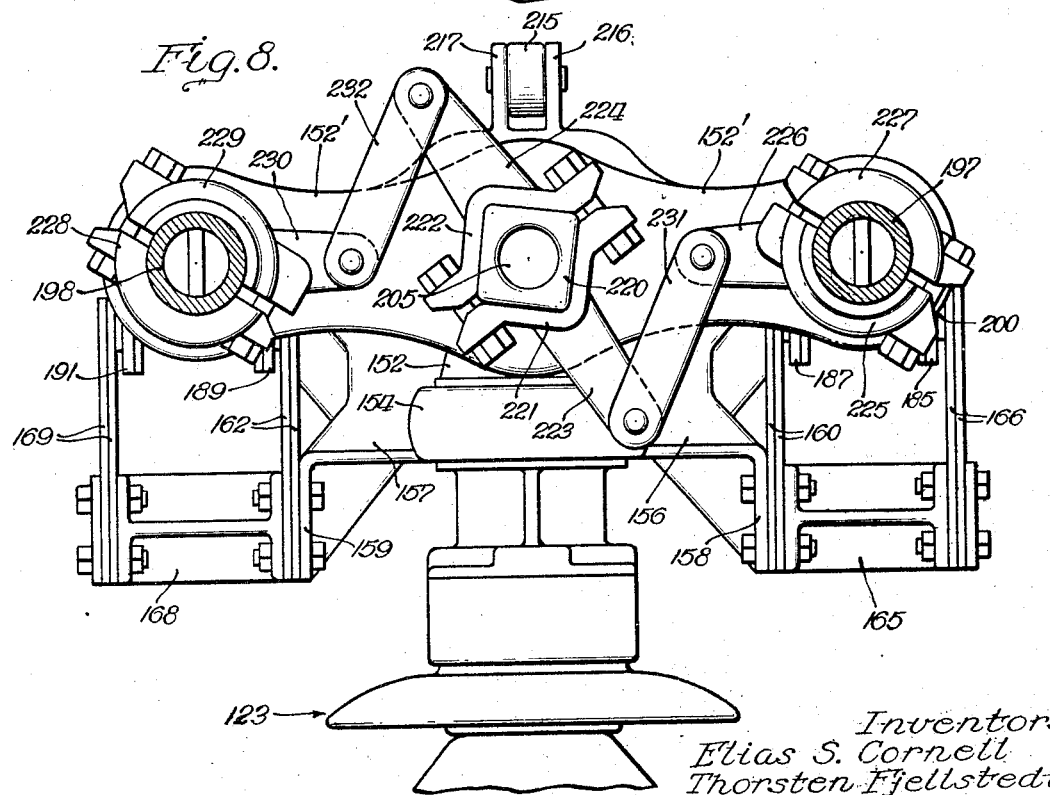

Patented Apr. 20, 1943

2,316,844

UNITED STATES PATENT OFFICE 2,316,844

SWITCHING DEVICE

Elias S. Cornell and Thorsten Fjellstedt, Chicago, and Stanley C. Killian, Oak Park, Ill., assignors to Delta-Star Electric Company, Chicago, Ill., a corporation of Illinois Application November 12, 1940, Serial No. 365,308

17 Claims. (Cl. 200—48)

This invention relates to switches, and is particularly concerned with electrical switching devices provided for carrying heavy currents.

The general object of the invention is the provision of a new and improved switch characterized by simplicity of design and certainty as well as reliability in operation. In order to realize this object, we have considered all component parts required in an apparatus of this type and their relation to as well as cooperation with each other; we have rearranged, modified and re-designed these parts, and have introduced new and improved structural elements, resulting in the noval switching devices which form the subject matter of this specification.

A brief review of some of the considerations leading up to the invention and of some of its salient features is presented below so as to support the understanding of the detailed explanations which are to follow.

A switch of the type disclosed herein is used for making and breaking conductive connection between current-carrying conductors, lines or bus bars or the like. The switch may be used outdoors and must therefore be adapted to withstand varying weather conditions; its operating parts must reliably function even when covered with sleet or ice. It should be so constructed that it can be mounted and operated in any position, for example, upright on top of a supporting structure, or in vertical position on the side thereof, or in inverted position depending therefrom. These are only a few of the requirements that should be and are fulfilled by the switches made in accordance with this invention.

The new switch may be arbitrarily considered as comprising stationary terminal contact means, a movable switch blade or blades conductively connected therewith, and a set of distantly disposed contact or terminal means for engagement with the switch blade. The switch blade is rotatably mounted at or near one end thereof, and its motion is controlled by an actuating mechanism which is disposed on a rotatable insulating stack. An actuating mechanism of this type, which is suitable for use in the present invention, is disclosed in U. S. Patent No. 2,231,992 dated February 18, 1941. This mechanism, upon rotation of the rotatable stack, causes the switch blade to swing through an arcuate path from open to closed position, and to rotate angularly around its own axis incident to its arcuate movement so that its contact-making end portion at the moment of completing the closing operation of the switch, is inserted in the distantly located contacts with a high pressure contact-making action. The operation is reversed during the switch-opening action; that is, the blade is first rotated around its own axis so as to relieve the high contact pressure, and is then swung through the arcuate path away from the contacts into its normal disconnect position. The switch may be equipped with one blade or with a plurality of blades, and in the latter case, the blades operate simultaneously and in synchronism.

Some of the particular objects and features of the present invention may be briefly stated as follows:

An object of the invention relates to a new and improved switch of this type having a switch blade rotatably mounted intermediate its ends, with actuating means for rotating the blade and for moving it through an arcuate path from open to closed position, and vice versa.

Another object is realized in the provision of a switch as defined in the preceding paragraph wherein a cross-sectionally polygonal member constitutes the switch blade.

A further object has to do with the provision of new means for producing and maintaining high pressure contact relation in the closed position of the switch between the switch blade and its mounting structure which also carries the terminal contact bars. This means comprises contact structures of novel form and arrangement for high pressure contact engagement directly with the inner end of the switch blade when the blade is in closed position.

Another object finds expression in the provision of new stationary contact means for high pressure contact engagement with the far or outer contact-making end of the switch blade. This means is similar to that defined in the immediately preceding paragraph, and comprises principal generally flat elongated members with a plurality of resilient contact springs angularly projecting therefrom and forming generally L-shaped structures therewith, together with reinforcing counter pressure springs engaging and coacting with these contact springs for the purpose of securing the high pressure contact engagement when the switch blade engages the contacts.

A further object is concerned with means for counterbalancing the weight of the switch blade so as to obtain a smooth, balanced and efficient action thereof.

Another object relates to the provision of a new switch wherein the blade is rotatably mounted intermediate its ends, together with stationary contact means for high pressure engagement with each end of the blade in closed position thereof.

Still another object has to do with the provision of a novel switch having a plurality of blades, for example, two blades disposed parallel with each other, wherein some or all of the aforementioned features are incorporated, together with a single actuating mechanism for operating the blades simultaneously, and means for coordinating and synchronizing the rotary action of the blades with the common arcuate operation thereof.

These objects and features, and additional objects and features not yet specifically mentioned, will not be described in detail with reference to the accompanying drawings, wherein—

Fig. 1 illustrates a side view of one embodiment of the switch;

Figs. 2A and 2B, taken together, represent a top plan view, on a larger scale, of the structure shown in Fig. 1, Fig. 2A showing the right hand end, and Fig. 2B the left hand end of the switch.

Fig. 3 shows a transverse view, on a somewhat enlarged scale, taken along line 3—3 in Fig. 1, looking at the stationary terminal contact assembly;

Fig. 4 is a transverse view along line 4—4 in Fig. 1, on a somewhat enlarged scale, looking at the contact assemblage located at and coacting with the inner end of the blade, and also showing means for counterbalancing and controlling the operation of the blade;

Fig. 5 illustrates a side view of a switch made in accordance with another embodiment of the invention;

Figs. 6A and 6B, taken together, represent on a somewhat larger scale a top plan view of the switch shown in Fig. 5, Fig. 6A illustrating the left hand end, and Fig. 6B the right hand end of the switch;

Fig. 7 is a transverse view taken along line 7—7 in Fig. 5, on a somewhat enlarged scale, showing the stationary contact assemblage at the left hand end of the switch; and Fig. 8 is a transverse view taken along line 8—8 in Fig. 5, on a somewhat larger scale, looking at the blade-actuating mechanism.

Like parts are designated by like reference numerals throughout the drawings.

Details and elements which may be assumed to be well known in the art will be described only to the extent necessary for supporting the understanding of what is new.

We will first describe the switching device shown in Figs. 1-4, inclusive. Figs. 2A and 2B should be taken together by joining the dot-dash line at the left of Fig. 2A with the dot-dash line at the right of Fig. 2B. Certain details of the actuating mechanism have been omitted in Fig. 4 in order to show other novel elements more clearly. The top plan view (Figs. 2A and 2B) and the sectional views (Figs. 3 and 4) are shown on a larger scale than that applied in Fig. 1, in order to bring out the placement and relationship of the various new elements.

Numeral 11 designates generally the supporting structure or base of the switch, which may comprise suitably joined structural steel beams or the like. Mounted on this structure in fixed relation thereto are the stationary insulator stacks generally designated by the numerals 12 and 13. Intermediate of these stacks is disposed the rotatable insulating stack 14. The latter may be journalled in a suitable bearing 15 and may be provided with an extension 16 (Figs. 1 and 4) for attaching thereto the proper desired or required driving means.

The stationary insulating stack 13 carries a frame or carriage structure 20 which may be made in the form of a bronze casting. It is fixedly attached at one end to the adapter 21 carried on the stack 13, and is provided at this end with two angularly disposed mounting extensions 22 and 23 for securing thereon the contact bars 60 and 61. The frame 20 extends forwardly in the direction of the rotatable stack 14 where it is provided with a journal section 24. Legs such as 25 and 26 (Figs. 1 and 4) extend forwardly from the journal section 24 forming mountings for receiving the contact pressure or counter pressure springs such as 70 and 72. The rotatable stack 14 is provided with a suitable adapter 26. Secured to this adapter is the blade-actuating mechanism, the structure being rotatably mounted in ball bearings in the journal portion 24 of the frame 20. It will thus be seen that the frame 20 is mounted at one end in fixed relation on the stationary stack 13 extending forwardly and providing a journal for the rotatable mounting of the upper end of the rotatable stack 14 which carries the actuating mechanism for the blade.

The blade-actuating mechanism, as has been mentioned before, is disclosed in Patent No. 2,231,992, which may be consulted for details of structure and operation. Briefly stated, this mechanism comprises an angular journal or crank pin attached to the top of the rotatable stack above the bearing portion 24 of the frame 20, being rotatable with the stack and intersecting the axis of rotation thereof. Rotatably mounted on this angular pin is the blade carriage or actuating member 27, best seen in Fig. 2A. Projecting angularly from this member is an extension 28 which in this embodiment of the invention projects into the tubular cross-sectionally rectangular blade 29 and is suitably attached to the blade, for example, by screws, as indicated in Fig. 4. Numeral 30 (Fig. 2A) indicates a bearing nut which holds the blade carriage 27 in rotatable engagement with the angularly disposed crank pin which is rotatable with the rotatable stack 14. The frame 20 is also provided in its forward end, and substantially along the line of the axis of the rotatable stack 14, with two extensions 31 and 32, best seen in Fig. 2A, for pivotally mounting the two legs 33 and 34 of the blade carriage guide 35. The forward connecting end of this guide member is made in the form of a bearing for journalling the bearing member 36 which may be attached to the blade 29 by means of suitable bolts, as indicated in Fig. 1 at 37. The arms or legs 33 and 34 of the guide member extend rearwardly from the pivot points 31 and 32 of the frame, as indicated at 38 and 39. These two extensions engage stop members 40 and 41 (Fig. 2A) when the switch is in open position, that is, when the guide and with it the blade 29 have been lifted through an arcuate motion in clockwise direction, as seen in Fig. 1, and perpendicularly out of the plane of the drawing, as seen in Fig. 2A. The actuating member 27 is provided with a stop member 42 for engagement with a fixed stop 43 which is attached to the connecting rib 44 of the frame 20. The engagement of stops 42—43 occurs when the switch is in the closed operated position in which it is shown in the various figures of the drawings.

Counterbalance means are provided in order to balance the weight of the blade 29 and to govern its arcuate motion from closed to open position, or vice versa, comprising the outer counterbalance housings 50 and 51 each equipped with a mounting leg such as 52, 53, for attachment to the arms 33 and 34, respectively, of the guide 35. These housings 50 and 51 are thus rotatable with the guide and partake in its arcuate swinging motion during the opening or closing movement of the switch blade 29. Attached to the frame 20 by means of the legs 54 and 55 (Fig. 4) are the stationary counterbalance housing members 56 and 57, which are disposed in back of the housings 50 and 51, respectively, and close the rear thereof. Counterbalance springs are mounted within these housings with the inner end of each spring connected to a corresponding stud, such as 58 and 59 shown in Fig. 2A. The outer end of each spring may be secured inside of the corresponding outer rotatable housing member such as 50 and 51.

The generally flat elongated contact bars or members 60 and 61, to which may be connected one side of the line bus bar or the like, are secured to the mountings 22, 23 of the frame 20. These members, which may be made of copper, project forwardly between the side walls of the frame 20, as particularly shown in Figs. 1 and 2A, passing along side the actuating member 27 where they are slightly curved, for clearance, as indicated at 62 and 63. The members terminate each in a set of contact springs or contact fingers 64—65 and 66—67, respectively. These contact springs are in this embodiment formed from the members 60, 61 and extend along a line at the left of and parallel to the axis of the rotatable insulating stack 14. Each member 60—61 is L-shaped at its forward end, and is angularly slotted so as to form the resilient contact springs which project angularly therefrom, as shown. The slotted structure of these particular contact springs does not appear from the drawings, as the corresponding portions are concealed behind other details; their shape will be fully apparent after examining the contact assemblage indicated at the upper left hand side of Fig. 1, showing the stationary contact assemblage mounted on the stationary insulating stack 12, comprising the flat elongated members and angularly disposed contact springs, which are formed similarly to the members and associated contact springs now being considered. Part of the slot provided in the member 60 is, however, shown in Fig. 2A at 68, separating the contact springs 64—65, and the corresponding part of the slot in contact bar or member 61, and separating the contact springs 66—67 is indicated at 69. The contact springs are curved, and the inner convex sides face the near or inner end of the switch blade 29 for high pressure contact engagement therewith when the blade is in closed position. The springs or fingers 64—65 are integral with the member 60 and springs 66—67 are integral with member 61.

In order to secure the required high pressure contact engagement, we have also provided sets of counterpressure springs such as 70—71, which may be made of bronze, coacting with the contact springs or fingers 64—65 and similar counterpressure springs 72—73 coacting with contact spring 66—67. These counterpressure springs may be secured to the mountings 25—26, respectively, extending from the frame 20. Each of these sets of springs is made of two leaves, as particularly shown in Fig. 4, and each is spaced from the contact spring with which it coacts by means of a spacer such as particularly shown in Figs. 2A and 4 at 75—76 and 77—78. In order to prevent inadvertent displacement of these spacers from engagement with their associated springs, each is provided with a stud or studs on either side thereof projecting through apertures on the corresponding springs. One such stud belonging to the spacer 75 is shown in Fig. 4 at 80. The placement of these contact springs with their spacers will be better understood after considering the structure of the stationary contact assembly supported on the stationary insulating stack 12 which will now be described in detail with reference of Figs. 1, 2B and 3.

Mounted on the stationary insulating stack 12 in fixed relation thereto is a carrier or frame 85 having mountings formed by two rearwardly-extending arms 86 and 87. These arms have been shown broken away in Fig. 3 in order to avoid confusion in the showing of certain details. Attached to these mountings are the copper contact bars forming the flat elongated members 88 and 89 which project inwardly and terminate in the L-shaped angularly slotted structures forming the contact springs 90—91 and 92—93. Each of these springs is curved, its convex side facing the switch blade 29 for high pressure engagement therewith. Each spring is also shaped so as to flare outwardly and upwardly, as particularly indicated in Figs. 2B and 3. Secured to mountings on the side walls of the frame 85 are also sets of counterpressure springs, each set consisting of two leaves, these sets being indicated by the numerals 95—96 which coact with the contact springs 90—91, respectively, and 97—98 coacting with the contact springs 92 and 93, respectively. Interposed between each set of counterpressure springs and the corresponding contact spring is a spacer such as indicated in Fig. 3 at 99—100, between the counterpressure spring set 96 and contact spring 91, and between counterpressure spring set 97 and contact spring 93. Each spacer is again provided with studs on each side, such as indicated at 101—102 and 103, which project through apertures in the associated springs. This contact spring assembly of the stationary contact means, which is provided for high pressure contact engagement with the outer contact end of the switch blade, is thus structurally similar to the spring assembly provided on the oppositely located stationary insulating stack 13 for high pressure contact engagement with the inner end of the switch blade. The lines or bus bars are connected at one end of the switch to the members 88, 89, and at the other end to the members 60, 61.

The various stages in the operation of the switch described in the foregoing may be briefly explained as follows:

The switch is shown in Figs. 1-4, inclusive, in closed position. The outer contact end of the polygonal switch blade 29 is in high pressure contact engagement with the convex faces of the contact springs 90—91 on one side and 92—93 on the other side, the first set of springs engaging the corner 105 and the other set engaging the corner 106 of the switch blade 29, as particularly shown in Figs. 2B and 3. The inner end of the switch blade is similarly in high pressure contact engagement with the convex faces of the contact springs 64—65 and 66—67 (Fig. 2A), which are part of the members 60—61. This high pressure contact engagement is reinforced and safeguarded by the counterpressure springs coacting with the contact springs, as previously described.

The actuating mechanism comprising the rotatable actuating member 27 is in the position shown in Fig. 2A, the stop 42 engaging the stop 43 mounted on the rib 44 of the frame 20. A secure and reliable conductive relationship therefore exists between the two ends of the switch, that is, between the two lines that may be connected to the members 88—39 and 60—61, respectively. There is nothing that can get out of order; nor are there any flexible contacts or the like as previously used in such structures. There is a direct and immediate conductive relationship established between the two opposite ends of the switch. This relationship and the way in which it is established forms a particular feature of this invention.

Now, when it is desired to break the connection, the rotatable stack 14 will be actuated by any suitable drive means so as to operate the actuating mechanism comprising the rotatable member 27. The blade will first rotate angularly around its own axis in order to break the high pressure contact engagement with its associated high pressure contact springs at either end, and will then swing through an arcuate path in clockwise direction, as seen in Fig. 1, to lift its outer contact-making end out of the contact springs 90—91 and 92—93. To describe this disconnect action a little more in detail, the crank pin of the actuating mechanism is angularly displaced due to the rotation of the rotatable insulating stack 14, causing the actuating member 27 to rotate initially so as to impart a twisting motion to the switch blade 29. The blade is thus angularly rotated from the position in which it is shown in Fig. 3 and high contact pressure between the contact edges 105 and 106 of the switch blade and the stationary contacts is relieved. Continuing rotation of the rotatable stack results in further rotation of the actuating member 27 on its crank pin, and the switch blade is swung out from its closed position through the arcuate path of its disconnect motion and is guided by the guide 35 in executing this motion. The blade describes an arcuate path of roughly 90° and comes to rest in an angular position with respect to the contact springs, which is also displaced by about 90° from the position shown in the drawings; that is, there is no contact in the open position of the blade between the blade and the contact springs at the inner end of the blade. The stop extensions 38—39 on the arms 33—34 of the blade carriage guide 35 engage the fixed stops 40—41 in the open position of the switch, and the blade is locked against inadvertent displacement due to a certain locking feature incorporated in the structure of the actuating mechanism. Further details of the operation of this mechanism may be had from consulting the previously mentioned Patent No. 2,231,992.

The switch closing operation takes place in reverse direction from the one just outlined; that is, the rotatable stack 14 is rotated in the proper direction, and this rotation by means of the actuating mechanism causes the switch blade to rotate angularly around its own axis and to move gradually through the arcuate path to the position in which it is shown in the drawings, until its contact-making end is close to and just above the stationary contacts supported on the insulating stack 12. The blade is then inserted into these contacts, and when this is accomplished the blade is twisted into its final high contact pressure position.

The counterbalance spring mechanism provides for a smooth and even motion of the switch blade in its closing as well as opening movements, and also relieves the strain on the mechanism that otherwise would be put on it due to the shifting weight of the blade in either direction of operation. It must be considered in this connection that the switch may assume considerable proportions with correspondingly great weights of its individual parts, depending on the current which is to be controlled by it.

The use of the tubular cross-sectionally polygonal blade described in connection with this embodiment of the invention presents particular advantages. However, it is clear that another type of blade could be used, for example, a blade of generally cylindrical form with the ends flattened out (as shown in the embodiment illustrated in Figs. 5–8), so as to provide for the necessary cross-sectional shape which is in such a form desirable for the purpose of obtaining the high pressure contact engagement.

If desired, a grounding switch may be provided in connection with this structure, and may receive the form indicated in Figs. 1 and 3.

Attached to the leg 86 of the frame 85 may be a suitable bracket 110 carrying contacts such as 111 and 112. The grounding blade 113 is rotatably mounted at its lower end on a suitable operating mechanism comprising the shaft 114 which may be mounted between two brackets 115 and 116, and may be suitably operated in any desired or required manner. A flexible connection is indicated at 117 conductively connecting the blade with the base 11 of the switch. A grounding device as disclosed in the previously mentioned patent may be employed in place of the one shown herein.

It is believed that the embodiment shown in Figs. 5–8, inclusive, will be readily understood, keeping in mind the salient features incorporated in the above described structure. The modification is concerned with a double-blade switch; that is, instead of one blade there are two blades operable simultaneously in a common plane, each coacting at either end with its own stationary contacts. This double-blade switch will now be described with reference to Figs. 5–8, inclusive. Figs. 6A and 6B must be taken jointly by aligning the dot-dash line at the left of Fig. 6B with the dot-dash line at the right of Fig. 6A. These two figures show the mechanism of Fig. 5 in top plan view on a larger scale so as to bring out the details.

The base or supporting structure for the switch is indicated at 120. It carries at one end the stationary insulating stack 121 supporting a stationary contact assemblage and associated contact bars connected to one end of the line, and two stationary stacks generally indicated in Figs. 5 and 6B at 122, supporting a frame which carries the stationary contact assemblage to which is connected the other side of the line or bus bars or the like. The frame mounted on the stationary insulating stacks 122 also supports the actuating mechanism of the switch and the counterbalance means for the switch blades. Intermediate of the stationary insulating stacks 121—122 is disposed a rotatable insulating stack generally indicated in the drawings by the numeral 123. This stack is rotatably mounted at its lower end in a suitable ball bearing 124 and is provided with an extension 125 for imparting thereto the rotary drive in such a way as may be desirable or necessary.

Mounted on the two stationary insulating stacks 122 is the frame 130, which may be a bronze casting. This frame or carrier structure extends inwardly in the direction of the rotatable stack 123, and is provided with means for mounting thereon a number of operating elements as follows: At the rear wall of the frame 130 is provided a bracket-like member 131 from which extend the arms 132 holding the inner stationary counterbalance housings 133. The bottom and the rear wall of the frame branch to each side, as particularly shown in Fig. 6B, and then extend forwardly at an angle, being provided at the two oppositely disposed angular portions with mounting means 134 and 135 for the attachment of the contact bars 136—137 and the flat elongated members 138—139 on one side, and for similar attachment on the other side, to the mounting member 135, of the contact bars 140—141 and the members 142—143. From the mounting members 134—135 the side walls 144—145 of the frame extend at an angle inwardly and terminate in the bearing members 146—147. Rotatably mounted on these members are the arms 148—149 and 150—151 of the guide member 152'. Between the arms 149—150 of the guide is located the blade-operating mechanism comprising the rotatable actuating member 152 which is mounted on a crank pin to which it is secured by a bearing nut 153. The crank pin, as in the case of the actuating mechanism of the previously described structure, is attached to the rotatable stack 123 and rotatable therewith, and is journalled in a bearing 154 which is part of and extends from the inwardly disposed, centrally located bottom portion 155 of the frame or carrier structure 130. The bottom portion of the frame extends laterally, as indicated at 156—157 (Figs. 6B and 8) where side walls of the frame drop down, as shown in Fig. 8 at 158—159, to provide mountings for the sets of counterpressure springs 160—161 (attached to the extension 158) and 162—163 (attached to the extension 159). As particularly shown in Fig. 8, an adapter such as 165 is attached to the extension 158 of the frame holding the counterpressure springs 160—161, and mounted to the other side of this adapter are the two sets of counterpressure springs 166—167. A similar adapter 168 is secured to the frame extension 159 on the opposite side of the structure holding in position the counterpressure spring sets 162—163, and secured to the outside of this adapter are the sets of counterpressure springs 169—170. Each set of counterpressure springs comprises two leaves, as shown in the drawings.

The various elements, generally described above in order to explain the structure and purpose of the frame or carrier, will now be explained in detail.

The contact bars 136—137 and the oppositely located contact bars 140—141 are attached to the mounting members 134—135, of the frame jointly with the flat elongated members 138—139 and 142—143, as clearly shown in Fig. 6B. The contact springs extend from these members inwardly, and are shaped as shown so as to provide for the proper clearance between the two springs of each set at the point where contact is to be made with the inner ends 195 and 196 of the switch blades 197 and 198. Each spring is provided with an angular slot consisting of a longitudinal slot section, as indicated in Fig. 5 at 180, and a slot section perpendicular thereto, as shown at 181. The perpendicularly disposed slot sections of the springs 139, 142 and 143 are designated in Fig. 6B by numerals 182, 183 and 184. The contact portions of these springs are curved, as shown at 185—186 (spring 138), 187—188 (spring 139), 189—190 (spring 142) and 191—192 (spring 143), the convex sides facing inwardly so as to provide for high pressure contact with the corresponding inner ends 195 and 196 of the switch blades 197 and 198. Interposed between each contact spring and the associated counterpressure spring set is a spacer such as 200 shown disposed between the set of counterpressure springs 166 and the contact spring 185, and 201 interposed between the counterpressure springs 167 and contact spring 186. Each of these spacers is provided with studs which enter suitable apertures in the associated contact springs and counterpressure springs, the studs of the spacers 200 and 201 being indicated in Fig. 5 at 202 and 203. Similar spacers are interposed between each contact spring and its corresponding set of counterpressure springs.

The actuating mechanism may again be of the same general type and operation as disclosed in the previously mentioned Patent No. 2,231,992. The upper end of the rotatable insulating stack 123 is journalled in the bearing 154 which is part of the frame or carrier structure 130, as already described. Fixedly mounted on the rotatable insulator is an angularly disposed crank pin, and rotatably attached to this crank pin by means of the bearing nut 153 is the blade control or actuating member 152. Details of the structure and operation of this actuating mechanism may be had from consulting the co-pending application. The actuating member 152' is provided with an extension 205 which projects into the bearing portion 206 of the guide 152, where it is rotatably mounted in ball bearings. This guide extends from the center to either side of the structure, as is particularly apparent from Figs. 6B and 8, and carries the two blades 197 and 198, one on each side, each blade being rotatably mounted within the guide. The guide itself is pivotally mounted on the bearing members 146 and 147 of the frame 130 by means of the arms 148—149 and 150—151.

Neglecting for a moment the specific actuation of the switch blades and keeping in mind only that the guide 152' is journalled on the bearing members 146—147, also keeping in mind that the rotation of the rotatable insulating stack 123 is followed by displacement of the actuating member 152, causing the extension 205 to go through a rotary motion and through an arcuate swinging motion (perpendicularly out of the plane of the drawing, as seen in Fig. 6B), it will be clear that such operation of the actuating mechanism will swing the guide 152', and with it the blades 197—198 clockwise, as seen in Fig. 5, during the disconnect operation of the switch, into the disconnect position of the blades indicated in Fig. 5 in dotted lines, and vice versa, in counterclockwise direction to bring about the closed position in which the switch is shown in the drawings. The control mechanism for controlling, guiding and synchronizing the operation of the blades will presently be described. We first want to call attention more in detail to the counterbalancing device provided in this switch.

The inner stationary housing members 133 (Fig. 6B) telescope into the cup-like outer rotatable housing members 210—211, respectively. Counterbalance springs are contained in each of the housings, the inner end of each spring being attached to a suitable stationary shaft, and the outer end to the corresponding cup-like rotatable housing 210—211. The housing 210 is provided with an arm 213 and the housing 211 with a similar arm 214, and these arms are joined with a link 215 journalled between the two bracket extensions 216—217 which project from the guide member 152'. The tension of the springs contained within the housings 133—210 and 133—211 is propagated to the arms 216—217 and therefore directly to the guide 152', in order to exert a counterbalancing force when the blades are moved in response to the operation of the actuating mechanism.

As has been already briefly explained, the extension 205 of the actuating member 152 projects into the portion 206 of the guide 152' where it is journalled in a ball bearing. The arcuate swinging motion of the extension 205 of the member 152 is thus transmitted to the blades 197—198 in order to lift the blades out of engagement with the contacts at each end thereof or to insert these blades when it is desired to close the switch. However, the extension 205 also describes a rotary motion around its own axis, and this motion must be coordinated with respect to and transmitted to the blades 197 and 198, the blades rotating within the bearings at each end of the guide 152'. In order to accomplish this operation, we have provided the control means which will now be described particularly with reference to Figs. 6B and 8.

The extension 205 is provided at its end with a polygonal member 220. Two clamp members 221 and 222 are attached to this polygonal member, as shown in the drawings, the clamp member 221 carrying a link 223, and the clamp member 222 being provided with a link 224. A clamp comprising the parts 227 and 225, the latter carrying an arm 226. is similarly attached to the blade 197, and a like clamp is attached to the blade 198 comprising the parts 228 and 229, the latter carrying an arm 230. The arm 226 is movably connected with the arm 223 through the medium of a link 231, and the arm 230 is similarly joined with the arm 224 through the medium of the link 232. The rotary motion of the extension 205 of the control member 152 is transmitted through this link means to the blades 197 and 198, and the blades are thus rotated simultaneously but in opposite directions. And inasmuch as the extension 205, which is rotatably journalled in the bearing portion 206 of the guide 152', not only goes through a rotary motion in response to a rotation of the rotatable stack 123, but also through an arcuate swinging motion, it follows that the guide will also be caused to go through this swinging motion, the guide being pivoted on the bearing or journal members 146—147 through the medium of the arms 148—149 and 150—151, and the blades will thus be carried through the arcuate path, in clockwise direction (as seen in Fig. 5) for opening the switch, or in counterclockwise direction for closing it.

The stationary contact assemblage provided for high pressure contact engagement with the outer contact-making ends of the blades 197—198 is mounted on the stationary insulating stack 121. This contact assemblage is described below with reference to Figs. 5, 6A and 7.

The insulating stack 121 carries the usual adapter also shown in connection with the other insulating stacks, and mounted on this adapter is a frame generally indicated by the numeral 240. This frame may be a bronze casting, and carries two lateral arms 241 and 242, each arm terminating in a downwardly directed flange-like mounting extension such as indicated in Fig. 7 at 243—244. Attached to each of these mountings are the counterpressure springs 244—245, 246—247, 248—249, and 250—251, each comprising two leaves, as shown in the drawings. The mounting of these sets of counterpressure springs is accomplished through the medium of the adapter members 252—253 shown particularly in Fig. 7.

The frame 240 is also provided with two outwardly directed portions 255 and 256 which are joined in the rear by a cross member or rib 257. At opposite ends of the cross rib are disposed the extensions 258—259, forming mounting means for attaching to the frame the contact bars 260—261 and like bars on the opposite side, as indicated at 262—263, and also the corresponding flat members 264—265 and 266—267 forming the contact springs. It will be observed that the means for attaching these members and contact bars are generally similar to the corresponding means located at the other end of the switch, as shown in Fig. 6B. The members 264—265—266—267 are roughly L-shaped, and angularly split or slotted, as shown in connection with the member 264 in Fig. 5, which is again similar to the corresponding structures on the other end of the switch. The member 264, and likewise each of the other similar members in this assembly, thus provides two contact springs, as indicated in Fig. 5 at 270—271. The other contact springs constructed in this manner from the members 265, 266, 267, are indicated at 272—273, 274—275, and 276—277. The spring portions are curved, presenting the convex sides inwardly so as to provide for high pressure contact engagement with the flattened contact-making portions 280 (blade 197) and 281 (blade 198). Each set of counterpressure springs such as 244 is separated from its associated contact spring such as 271 by a spacer indicated in Fig. 7 at 285. Each spacer is provided with studs which protrude into suitable aperture in its associated counterpressure springs and also in the associated contact spring. The outside stud of the spacer 285 in Fig. 7 is indicated at 286. The studs of the spacers coacting with the other contact springs shown in Fig. 7 are not designated by special reference numerals, in order to avoid unnecessary repetition.

The operation of this last described switch is generally analogous to that of the first explained structure. However, in view of certain additional features incorporated in this embodiment, its operation may be briefly described as follows:

The contact bars 136—137 and 147—141 at the right side of the switch (Fig. 6B) may be connected with a bus bar or with a line, and similarly, the contact bars 260—261 and 262—263 at the left side of the switch (Fig. 6A) may be connected with a bus bar or with a line. The switch is shown in the drawings in closed position. It is provided with generally round or cylindrical switch blades 197 and 198 (blades of other shape may be used, e. g., polygonal in cross-section, as in the first described structure), the flattened ends 280—281 being in high pressure contact engagement with the stationary contact springs mounted on the stationary insulating stack 121, and the flattened inside ends 195 and 196 being in high pressure contact engagement with the contact springs mounted on the frame attached to the two stationary stacks 122. Conductive relation therefore is established between the bus bar or line terminal attached to the contact bars at one end of the switch, and the corresponding bus bar or line terminal attached to the contact bars at the other end of the switch. The connection is positive and reliable at either end of the contact blades. There are no movable parts such as flexible conductors or similar elements that would be subject to damage or give rise to trouble of any kind that may occur under normal operating conditions. We do not mean by "normal operating conditions" any particular predetermined condition to which the switch may be subjected. It may be covered with sleet, snow or ice, and even the most unusual conditions that may be imposed, for example, by weather, will not disturb the reliable connection established between the switch blades and the contacts at either end thereof.

When it is desired to actuate the switch so as to break the connection, the rotatable insulating stack 123 will be actuated and will rotate in its bearings 124 and 154, thereby also rotating the angularly disposed crank pin which forms part of the actuating mechanism of the device, transmitting the motion to the actuating member 152 in a manner which is described more in detail in the previously mentioned co-pending application. It may be mentioned at this point that this switch is, of course, also provided with stop means to determine its terminal positions in either direction of operation. The actuating member 152, for example, is provided with a suitable stop such as discussed in connection with the first described embodiment (stop 42, Fig. 2A), which in closed position of the device is in engagement with a stop 300 shown in Fig. 6B. Suitable stops are also provided for cooperation with the extensions 301 and 302 projecting rearwardly from the arms 149—150 of the guide member, so as to limit and determine the opening operation of the switch. The blade actuating member 152 rotates and transmits its rotary motion to the polygonal member 220 (Figs. 6B and 8) which is attached to its extension 205. Therefore, the links 231—232 are actuated and rotate the blades 197—198 through the medium of the link members 226 and 230. The flattened contact-making ends 195 and 280 of the blade 197 and likewise the corresponding contact-making ends 196 and 281 of the blade 198 are thus angularly displaced within their associated contacts to relieve the high contact pressure obtaining in the closed position of the switch. The twisting motion is a powerful one so as to break ice or sleet, should the device be under such condition. Thereupon and responsive to further rotation of the rotatable stack 123, the actuating member 152, through its extension 205, lifts the blade guide 152' and therewith the blades 197 and 198 through an arcuate path in clockwise direction, as seen in Fig. 5, and perpendicularly out of the plane of the drawing, as seen in Figs. 6A and 6B, the far ends of the blades (left end of the switch) moving upwardly away from the stationary contacts mounted on the stationary insulating stack 121, and the near or inner ends of the blades moving downwardly within and with respect to their associated contacts but out of engagement therewith due to the initial twisting motion imparted to the blades. In Fig. 5 the blades are shown in open position in dotted lines. It will be observed that the arcuate motion of the blades is less than 90° in order to avoid interference of the inner ends of the blades with the fixed parts of the mechanism. The extent of the arcuate movement of the blades, however, is not to be considered in the nature of a criterion or a particular limitation. It may be predetermined and adjusted as desired or required to meet any particular operating conditions.

The movement of the blades during the closing operation proceeds in reverse direction. The rotatable stack 123 is rotated in the proper direction, transmitting the rotation to the actuating member 152 which through its extension 205 actuates the link mechanism shown in the drawings, to rotate the blades so as to displace the end portions thereof angularly with respect to the contacts, and to swing the blades simultaneously through an arcuate path downwardly and in counterclockwise direction, as seen in Fig. 5, until the blades enter the contact-making ends of their associated stationary contacts. The blades at this moment are in an angularly tilted position and are substantially out of contact with the contact springs, or at any rate they do not yet operate against the contacts with any particular pressure. When the arcuate closing movement is almost completed the rotary angular twisting motion of the blades is increased and the blades are thus twisted into the high pressure contact engagement with the corresponding contact springs. The switch is then again in the closed position in which it is shown in the drawings.

The counterbalance mechanism guides and controls the movement of the blades in either direction of operation, counterbalancing the shifting weight of the blades so as to accomplish a smooth, balanced and uniform action in every phase and through every step of the operation. The load imposed upon the actuating mechanism is thus equalized and balanced throughout the entire operation of the switch.

In the embodiments described herein we have shown an actuating mechanism such as disclosed in detail in the previously noted patent. It is understood, of course, that different types of actuating means may be used for bringing about the operation of the switch blade or blades.

Changes may be made within the scope and spirit of the appended claims, wherein we have defined what is considered new and what we desire to have protected by Letters Patent of the United States.

We claim:

1. In combination, a pair of laterally spaced stationary contact means, a switch blade for each contact means, a pivotally mounted guide, means in said guide for rotatably mounting said switch blades, a rotatable actuating member, extension means on said actuating member rotatably journalled in said guide for moving said guide to move said switch blades through an arcuate path so as to align the end of each blade with the stationary contact means provided therefor, and control means actuated by said extension means for simultaneously rotating said switch blades around their own axes to move said ends thereof into high pressure contact engagement with the associated contact means.

2. The combination and structure defined in claim 1, wherein said control means comprises a pair of arms secured to said extension means, an arm attached to each of said blades, and link means for movably interconnecting said arms to transmit the motion of said extension means to said blades.

3. In an electric switch of the class described, a stationary contact structure for high pressure contact engagement with a movable switch blade comprising a first mounting, a contact spring secured thereto and projecting therefrom, a plurality of integral contact fingers laterally projecting from said spring at the free end thereof, a second mounting, counterpressure springs one for each of said fingers secured to said second mounting and extending therefrom along lines paralleling the axes of said fingers, the free ends of said counterpressure springs being disposed in back of said fingers, and spacer means between said fingers and the counterpressure spring therefor.

4. The contact structure defined in claim 3, wherein one side of each of said fingers is shaped convex for direct engagement with said blade.

5. The contact structure defined in claim 3, together with a unitary frame forming said mountings.

6. A contact device for an electric switch of the class described comprising a generally flat elongated member, a plurality of resilient contact springs projecting angularly from said member at one end thereof and forming a generally L-shaped structure therewith, a convex contact making surface formed at one side of each of said springs, and a counterpressure spring for each of said contact springs disposed in back thereof.

7. The structure defined in claim 6, wherein said contact springs are integral with said member.

8. The structure defined in claim 6, wherein said contact springs are integral with said member, together with a mounting frame, and means on said frame for securing said member and said counterpressure springs.

9. A contact device for an electric switch of the class described comprising a generally flat elongated member, a plurality of progressively larger generally L-shaped contact springs disposed in a common plane edgewise relative to each other to form a generally L-shaped contact at one end of said member, a curved contact making surface formed on one side of each of said contact springs, and a plurality of counterpressure springs one for and disposed in back of each of said contact springs.

10. The structure defined in claim 9, wherein said contact springs are integral with said elongated member.

11. The structure defined in claim 9, wherein said contact springs are integral with said elongated member and are formed thereon by L-shaped parallel slots cut in said member at the end thereof.

12. The structure defined in claim 9, wherein generally bar-shaped members of substantially equal length constitute said counterpressure springs, and wherein the free ends thereof are disposed in back of said contact springs along a common line which parallels the edge of said elongated member.

13. The structure defined in claim 9, together with a mounting frame, and means on said frame for securing said member and said counterpressure springs.

14. In an electric switch having stationary contacts disposed spaced from each other to form a gap and a unitary elongated blade for bridging said gap in closed position of said switch by direct high pressure contact engagement of its opposite free ends with said stationary contacts, a device for operating said blade comprising a pivotally mounted guide member, bearing means in said guide member for supporting said blade for rotation therein around its own axis, a movable actuating member for moving said guide around its pivot to move said blade through an arcuate path so as to move the opposite free ends thereof toward and away from said stationary contacts to effect the closing and opening of said switch, respectively, and extension means projecting from and being movable with said actuating member and being connected with said blade for simultaneously rotating said blade within said guide angularly around its own axis to rotate the opposite free ends of said blade into and out of high pressure contact engagement with said stationary contacts coincident with the arcuate motion thereof.

15. The structure and combination defined in claim 14, wherein the connection between the extension means and the blade is effected by link means disposed adjacent said guide member.

16. An electric switch of the class described comprising a guide member extending perpendicular to the longitudinal switch axis, means for pivotally mounting said guide member for arcuate motion with respect to the switch axis, a plurality of switch blades disposed in parallel to each other and paralleling said switch axis, said blades projecting through said guide and being rotatably mounted therein near one end thereof, link means disposed adjacent said guide in parallel therewith on one side thereof and interconnecting said blades, and an actuating member projecting into and through said guide and being rotatably mounted therein, said actuating member acting upon said guide and upon said link means for moving said blades through an arcuate path with respect to said switch axis and for simultaneously rotating said blades angularly around their own axes.

17. In an electric switch, the combination of a switch blade and an operating mechanism therefor comprising a guide member extending crosswise of the longitudinal blade axis, means in said member for rotatably journalling said blade therein, actuating means projecting through and rotatably journalled within said guide for moving it and said blade through an arcuate path, and link means connected with and actuated upon by said actuating means for simultaneously rotating said blade around its own axis.

ELIAS S. CORNELL.
THORSTEN FJELLSTEDT.
STANLEY C. KILLIAN.